Nov. 8, 1932.  A. R. BAILEY  1,886,622
LOCOMOTIVE LUBRICATOR
Filed Sept. 25, 1930
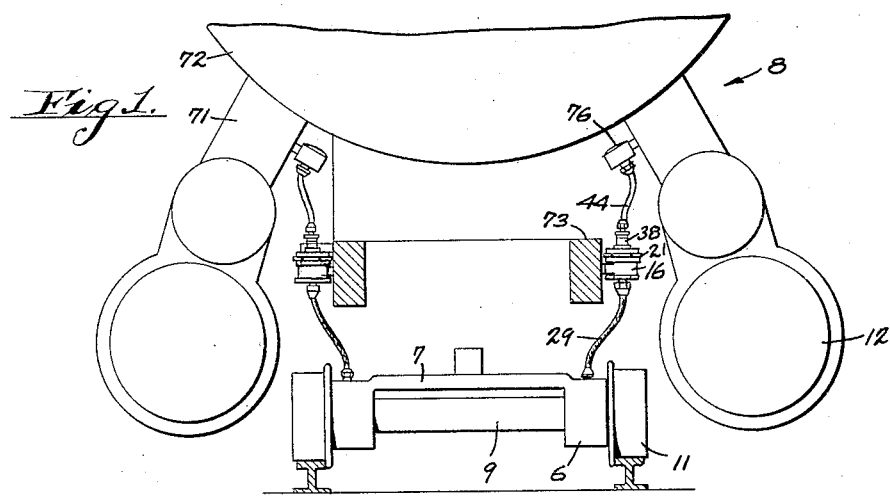
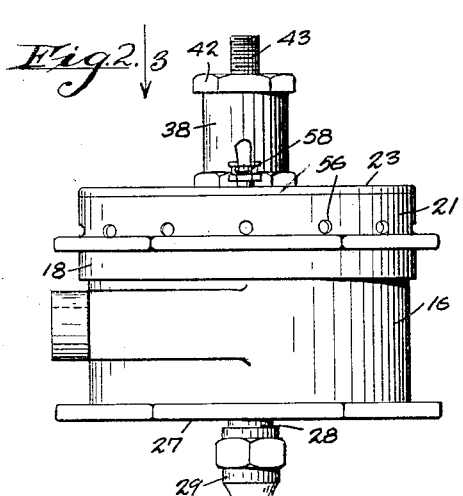
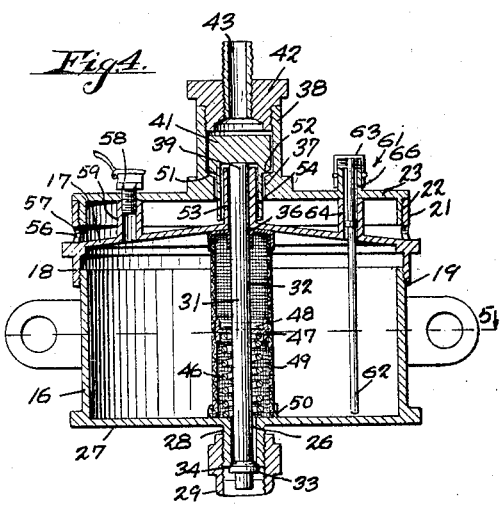
Inventor
Albert R. Bailey
by Hazard and Miller
Attorneys Patented Nov. 8, 1932

1,886,622

UNITED STATES PATENT OFFICE

ALBERT R. BAILEY, OF SAN BERNARDINO, CALIFORNIA

LOCOMOTIVE LUBRICATOR

Application filed September 25, 1930. Serial No. 484,387.

This invention relates to lubricators, and more especially to a lubricator adapted to feed suitable lubricant to one or more journals of a steam locomotive or other engine operated by fluid pressure.

An object of the invention is to provide a lubricator of the general class described, which is particularly adapted to, though not necessarily limited for, use in supplying lubricant to one or more journals of the pony truck of a steam locomotive, the lubrication of which has heretofore presented difficulties of considerable importance.

A further object is to provide a lubricator, the operation of which is dependent upon the imposition of a certain amount of fluid pressure thereupon, and to so connect the actuating means of the lubricator with the locomotive itself in such a manner that the lubricator is not operated except when fluid is supplied to the cylinders of the engine at pressure sufficient to cause operation thereof, with the result that the lubricator is not permitted to operate except when the locomotive is in motion, thereby effecting a material saving of oil, as compared to previously existing lubricators, from which oil is permitted to drip regardless of whether the locomotive is in operation or at a standstill.

A further object is to provide a lubricator as hereinabove described, in which various features of refinement are incorporated, whereby the admixture of steam or the liquid condensate thereof, or whatever other fluid may be employed for the operation of the lubricator, with the lubricant itself, is positively prevented.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a diagrammatic, transverse, vertical sectional view taken through the lower portion of a conventional steam locomotive adjacent the cylinders thereof, and showing the preferred manner of mounting lubricators of my invention thereupon, so as to permit them to feed lubricant to the journals of the pony truck of the locomotive.

Fig. 2 is an enlarged elevational view of the lubricator.

Fig. 3 is a top plan view, the direction of view being indicated by the arrow 3 of Fig. 2.

Fig. 4 is a vertical medial sectional view, the plane of section being taken upon the line 4—4 of Fig. 3, with the direction of view as indicated.

Fig. 5 is a horizontal sectional view taken upon the line 5—5 of Fig. 4, with the direction of view as indicated.

Fig. 1 shows the preferred manner of mounting lubricators constructed in accordance with the principles of the present invention, so that they are capable of carrying out the function of efficiently lubricating the journals 6 of the pony truck 7 of a conventional steam locomotive 8, so as to reduce to a minimum the friction developed between the journals 6 and the axle 9 rotatable with respect thereto, and upon which the relatively small wheels 11 of the pony truck 7 are secured. The lubrication of these journals 6 has heretofore caused considerable difficulty because of their being relatively inaccessible, inasmuch as they are concealed by the cylinders 12 of the locomotive; in fact in the case of locomotives of the usual construction, lubrication of these journals can be effected only by running the locomotive over a pit, so that a workman can gain access to the journals 6 from underneath. Accordingly, whenever the journals 6 are lubricated, the workman usually applies a relatively large amount of lubricant thereto, in the endeavor to provide the journals 6 with sufficient lubricant to last until the next time the locomotive is run upon a pit, because the positioning of the journals 6 is such that the engineer cannot lubricate them while in service. Accordingly, this excess of lubricant will be wasted, inasmuch as it will run through the journals and drip therefrom, and it has been found that the amount of lubricating oil wasted in this manner is of considerable proportions. In spite of this fact, the journals 6 are still inadequately lubricated, because all the lubricant which can be applied to the journals 6 will run therethrough, leaving the journals relatively dry long before the other portions of the locomotive require servicing, with the result that under most road conditions the journals 6 of the pony truck 7 tend to run hot.

The automatic lubricator of the present invention has been designed to obviate this difficulty in keeping the journals 6 of a locomotive pony truck 7 thoroughly lubricated at all times.

In its preferred embodiment this lubricator comprises a reservoir 16, having a top 17 removably securable to the upper end of the reservoir 16, by means of an interiorly threaded cylindrical flange 18, engageable upon threads 19 formed at the upper end of the reservoir 16. Another cylindrical flange 21 extends upwards from the upper surface of the top 17, and is interiorly threaded, as indicated at 22, for the reception of a cap 23, which, however, is not intended to be removed from the top 17 after the parts have once been properly assembled.

A port 26 of the reservoir 16, having a threaded nipple 28, is provided in the bottom 27, so that the fluid escaping from the reservoir 16 through the port 26 must pass through the nipple 28. A tube 29 may be secured to the nipple, so as to conduct fluid escaping therethrough to one or more journals 6 to be lubricated.

A valve, indicated in its entirety at 31, and comprising a stem 32 and a head 33, is associated with the port 26 in such a manner that it is capable of controlling flow of fluid therethrough into the tube 29. For this purpose, the head 33 is arranged below the lower end of the nipple 28, so that when the head 33 moves upwards it can engage a preferably conical valve seat 34 formed upon the lower end of the nipple 28, and thus positively prevent flow through the nipple. However, the stem 32 of the valve 31, which extends through the nipple 28, is materially smaller in cross sectional area than the bore of the nipple, so that when the head 33 of the valve is lowered from the valve seat 34, flow through the nipple 28 is permitted, proportional to the distance that the valve 33 moves from the valve seat.

The stem 32 extends from the head 33 all the way through the reservoir 16, and through suitable apertures 36 and 37 in the top 17 and cap 23, respectively. A cylinder 38 is mounted upon the top 17 of the reservoir 16, through the expedient of the cap 23, whereby the cylinder 38 is positioned in spaced relationship from the top 17, although rigid therewith. The upper end 39 of the valve stem 32 extends into the lower end of the cylinder 38, so that it may be engaged by a plunger 41 which is reciprocably disposed within the cylinder 38. A preferably removable plug 42 closes the upper end of the cylinder 38, and carries a threaded nipple 43, whereby a pipe 44 may be connected thereto, so as to conduct fluid under pressure to the interior of the cylinder 38 above the plunger 41. Accordingly, it will readily be understood that when the plunger 41 is moved downwards by fluid pressure imposed upon the upper end thereof, it will force the valve stem 32 downwards, moving the head 33 away from the seat 34, so as to permit oil to flow from the reservoir 16, through the nipple 28 and into the tube 29. However, as soon as the pressure imposed upon the plunger 41 is relieved, the valve will be returned to port closing position by means of a coil spring 46 encircling the lower portion of the stem 32, and under compression between the bottom 27 of the reservoir and a washer 47 which encircles the stem 32, and which is prevented from moving upwards with respect thereto by means of a pin 48. The washer 47 is guided by a substantially cylindrical screen 49 which encircles the stem 32 and extends from top to bottom of the reservoir 16, thus serving to keep any sediment in the oil from being carried to the port 26. Cooperative with the screen 49 is a sediment trap formed by a circular flange 50 which extends upward from the bottom 27 of the reservoir, encircling the port 26, with the lower end of the screen 49 fitted therein. Sediment in the oil will settle to the bottom of the reservoir, and be kept from flowing to the port 26 by the flange 50.

The plunger 41 does not necessarily establish a tight sliding fit with the bore of the cylinder 38. Instead, I prefer to prevent leakage of the actuating fluid past the plunger 41 by forming a conical valve seat 51 at the bottom of the cylinder 38 encircling the aperture 37, and by forming the lower end of the plunger 41 complementarily with respect to the valve seat 51, thereby providing a valve 52 adapted to establish metal-to-metal contact with the valve seat 51 when the plunger 41 has been moved to its lower extreme of movement. Consequently, the greater the pressure imposed upon the plunger 41, the tighter will the valve 52 be pressed against its seat 51, thereby positively preventing any leakage of actuating fluid through the aperture 37. Inasmuch, however, as a slight amount of steam, or the condensate thereof, might have opportunity to leak past the seat 51, and into the aperture 37, before the valve 52 is enabled to reach its seat 51, I have provided means for preventing such leakage from entering the reservoir 16. A sleeve 53 extends upwards from the top 16 around the upper end of the stem 32; and a skirt 54 extends downwards from the bottom of the plunger 41, through the aperture 37, and around the sleeve 53. Consequently, any of the fluid which is able to leak past the valve seat 51 would have to pass downwards around the lower end of the skirt 54, then upwards between the skirt 54 and the sleeve 53, and then downwards between the sleeve 53 and the valve stem 32, before it would be able to enter the interior of the reservoir 16. By providing ports 56 leading from the atmosphere into the space 57 between the cap 23 and the top 17, an easier escape for this leakage is provided, especially in view of the fact that the top 17 slopes downwards from the sleeve 53 at its center, to the edges thereof, where the ports 56 are provided.

A filler cap 58 extends through the cap 23 and into a tube 59 which leads to the interior of the reservoir 16, so that the reservoir 16 may be filled with suitable oil by pouring it through the filler cap 58. A gauge 61, comprising a rod 62 having a cap 63 at its upper end, is also provided, whereby the amount of oil within the reservoir 16 may easily be ascertained. The rod 62 extends through a tube 64 into the interior of the reservoir, being retained in position by means of its cap 63, which is removably receivable upon a nipple 66 rigid with the upper surface of the cap 23. The cap 63 may easily be disengaged from the nipple 66, permitting the rod 62 to be withdrawn, and the length thereof, which is moistened with oil, observed, so that the depth to which the reservoir 16 is filled with oil may be ascertained.

Although the lubricator of the present invention is capable of affording convenience when used in conjunction with substantially any journal upon any motor operated by fluid pressure, or where fluid pressure is available, it is particularly useful in lubricating the journals 6 of the pony truck 7 of a locomotive 8, because of the inaccessibility of these journals 6 for hand lubrication, and also because of the convenience with which fluid pressure for the operation of the plunger 41 may be obtained when the lubricator is mounted adjacent the journals 6 of the pony truck 7. The main steam pipe 71, whereby live steam is conducted from the boiler 72 of the locomotive by way of the throttle valve (not shown) extends closely adjacent that portion of the frame 73 of the locomotive upon which one of the oilers should be mounted for most efficient feed of oil to the journals 6. Consequently, the lubricator and its contents will be warmed by heat radiated from the main steam line 71, with the result that the oil will be of substantially a certain degree of fluidity, regardless of prevailing weather conditions. This will permit setting the device when manufactured in such a manner that a given rate of flow of the oil is established, avoiding the necessity of making the effective length of the valve stem 31 adjustable.

A safety valve 76 is associated with preferably each of the lubricators employed. Each of these safety valves may conveniently be mounted upon the steam line 71, through which steam at a pressure of substantially forty (40) pounds per square inch must be flowing to the cylinders 12 before the locomotive 8 will start to move. Accordingly, each of the safety valves 76 should be set to "pop" at about forty (40) pounds, and the pipe 44 of the associated lubricator connected to the outlet port of the safety valve, the result being that as long as the pressure within the steam line 71 is lower than forty (40) pounds the lubricator will be inoperative, whereas as soon as the pressure within the steam line 71 exceeds forty (40) pounds, causing the locomotive to start movement, the lubricator will start feeding oil to the journal or journals 6.

It is to be understood that the details of the invention as herein disclosed, are subject to alteration within the spirit or scope of the appended claims.

I claim:

1. A lubricator comprising an oil reservoir having a port in the bottom thereof, a valve seat encircling said port, a cylinder mounted on the top of said reservoir, a valve stem extending slidably through said top into said cylinder, a plunger reciprocable within said cylinder, a valve carried by said stem, spring means normally holding said valve upon said seat, means for conducting fluid under pressure to said cylinder to move said plunger in the direction opposite that in which the spring means exerts force upon said valve, a seat in said cylinder encircling the aperture through which said stem extends thereinto, the bottom of said plunger being shaped complementarily to said seat and engageable therewith when the plunger is pressed by said fluid to the limit of its stroke, a sleeve extending upwards around said stem from the top of said reservoir toward said cylinder, and a skirt extending downwards from said plunger through said aperture around said stem.

2. A lubricator comprising an oil reservoir having a top, a flange extending upwardly therefrom and provided with an outlet port, a cap removably secured to said flange, a valve seat in the bottom of the reservoir, a cylinder mounted on the cap, a valve stem extending slidably into said cylinder, a plunger reciprocable within said cylinder and engaging said stem, a valve carried by said stem, spring means normally holding said valve upon said seat, means for conducting fluid under pressure to said cylinder to move said plunger downwardly to open said valve, a sleeve extending upwards from the top of the reservoir and encircling said valve stem, and a skirt on said piston extending downwards and surrounding said sleeve.

3. A lubricator comprising an oil reservoir having a conical top, a flange extending upwardly therefrom and provided with an outlet port, a screw cap removably fastened to said flange, a valve seat in the bottom of said reservoir, a cylinder mounted on the top of said cap, a valve stem extending slidably into said cylinder, a plunger reciprocable within said cylinder and engaging said stem, a valve carried by said stem, spring means normally holding said valve upon said seat, means for conducting fluid under pressure to said cylinder to move said plunger and the valve stem downwardly to open the valve, a sleeve extending upwards around said valve stem from the top of said reservoir, and a skirt on said plunger extending downwardly and surrounding the upper part of said sleeve.

In testimony whereof I have signed my name to this specification.

ALBERT R. BAILEY.